(12) United States Patent
Pan et al.

(45) Date of Patent: Aug. 16, 2005
(10) Patent No.: US 6,931,595 B2

(54) METHOD FOR AUTOMATIC EXTRACTION OF SEMANTICALLY SIGNIFICANT EVENTS FROM VIDEO

(75) Inventors: Hao Pan, Urbana, IL (US); Petrus J. L. van Beek, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 546 days.

(21) Appl. No.: 09/823,437

(22) Filed: Mar. 30, 2001

(65) Prior Publication Data

US 2002/0080162 A1 Jun. 27, 2002

Related U.S. Application Data (60) Provisional application No. 60/245,733, filed on Nov. 2, 2000.

(51) Int. Cl.[7] ................................................. G06F 3/00
(52) U.S. Cl. ..................... 715/723; 715/512; 715/719; 715/726; 348/563; 725/38
(58) Field of Search ................................ 715/500.1, 512, 715/716, 719, 720, 721, 723, 726; 348/563–565; 725/38, 41, 51; 345/716, 719, 720, 721, 723, 726

(56) References Cited

U.S. PATENT DOCUMENTS

| | | |
|---|---|---|
| 5,521,841 A | 5/1996 | Arman et al. |
| 5,805,733 A | 9/1998 | Wang et al. |
| 5,959,681 A | 9/1999 | Cho |
| 5,995,095 A | 11/1999 | Ratakonda |
| 6,055,018 A * | 4/2000 | Swan .......................... 348/448 |
| 6,144,375 A * | 11/2000 | Jain et al. ................. 715/500.1 |
| 6,219,837 B1 * | 4/2001 | Yeo et al. ...................... 725/38 |
| 6,236,395 B1 * | 5/2001 | Sezan et al. ................ 345/723 |
| 6,342,904 B1 * | 1/2002 | Vasudevan et al. ......... 345/723 |
| 6,418,168 B1 * | 7/2002 | Narita ................... 375/240.16 |
| 6,549,643 B1 * | 4/2003 | Toklu et al. ................ 382/107 |
| 6,678,635 B2 * | 1/2004 | Tovinkere et al. .......... 702/179 |
| 6,774,917 B1 * | 8/2004 | Foote et al. ................ 715/700 |

OTHER PUBLICATIONS

Vikraunt Kobla, et al; "Detection of Slow–Motion Reply Sequences for Identifying Sports Videos;" University of Maryland, Laboratory for Language and Media Processing; (At least one year prior to filing date) (6 pages).

Stephen S. Intille, et al; "Tracking Using a Local Closed–World Assumption: Tracking in the Football Domain;" Submitted to the Program in Media Arts and Sciences, School of Architectural and Planning (Aug. 5, 1994); M.I.T. Media Lab Perceptual Computing Group Technical Report No. 296; (62 pages).

(Continued)

*Primary Examiner*—X. L. Bautista
(74) *Attorney, Agent, or Firm*—Chernoff, Vilhauer McClung & Stenzel (57) ABSTRACT

A method of determining the boundary of a slow motion replay of an event in a video includes determining a statistical measure of different portions of the video. The video may include the event and the slow motion replay of the event. Based upon the statistical measure determining the boundary of the slow motion replay of the event.

38 Claims, 8 Drawing Sheets

OTHER PUBLICATIONS

Vikraunt Kobla, et al; "*Identifying sports videos using replay, text, and camera motion features;*" University of Maryland, Laboratory for Language and Media Processing; (At least one year prior to filing date) (12 pages).

S.E. Levinson, et al.; *An Introduction to the Application of the Theory of Probabilistic Functions of a Markov Process to Automatic Speech Recognition:* 1983 American Telephone and Telegraph Company, The Bell System Technical Journal vol. 62, No. 4, Apr. 1983; pp. 1035–1074.

Drew S. Saur, et al.;*Automated Analysis and Annotation of Basketball Video:* Department of Electrical Engineering, Princeton University, Princeton, NJ 08544; SPIE vol. 3022; o277–786X/97.

Dennis Yow, et al., *Analysis and Presentation of Soccer Highlights from Digital Video;* Department of Electrical Engineering, Princeton University, Princeton, NJ 08544; supported by Siemens Corporate Research, Princeton, NJ, an IBM Graduate Fellowship and a Sony Graduate Fellowship.

Stuart J. Golin; *New netric to Detect Wipes and Other Gradual Transitions in Video*, Sarnoff Corporation, DN 5300, Princeton, NJ 08543; Part of the IS & T/SPIE Conference on Visual Communications and Image Processing '99, San Jose, California, Jan. 1999; SPIE vol. 3653. 0277–786X/98.

Toshio Kawashima, et al., *Indexing of Baseball Telecast for Content–based Video Retrieval;* Department of Information Engineering, Hokkaido University Kita–13, Nishi–8, Sapporo, 060–8628, Japan. No–8186–8821–1/98; 1998 IEEE.

Jonathan D. Courtney,*Automatic Video Indexing Via Object Motion Analysis*;Pattern Recognition, vol. 30, No. 4, PP 607–625, 1997. 1997 Pattern Recognition Society, Pulbished by Elesevier Sciernce Ltd. Printed in Great Britain. 0031–3203/97.

* cited by examiner

Conventional definition of zero Crossings. There are 4 zero Crossings.

Modified definition of zero crossings. For $\theta_1$ there is one zero crossing and for $\theta_2$ there are no zero crossings.

METHOD FOR AUTOMATIC EXTRACTION OF SEMANTICALLY SIGNIFICANT EVENTS FROM VIDEO

CROSS-REFERENCE TO RELATED APPLICATIONS

This application claims the benefit of U.S. Provisional Application No. 60,245,733, filed Nov. 2, 2000.

BACKGROUND OF THE INVENTION

The present invention relates to a technique for detecting semantically significant events in a video sequence.

There has been a dramatic increase in the quantity of video available to the public. This trend is expected to continue or accelerate in the future with the convergence of personal computers and digital television. To improve the value of this information to users, tools are needed to help a user navigate through the available video information and find content that is relevant. For "consumer" users, such tools should be easy to understand, easy to use, and should provide reliable and predictable behavior.

Generally, there are three categories of known content-based video indexing and retrieval systems. A first category includes methods directed to the syntactic structure of video. This category includes methods of shot boundary detection, key frame extraction, shot clustering, tables of contents creation, video summarizing, and video skimming. These methods are generally computationally conservative and produce relatively reliable results. However, the results may not be semantically relevant since the methods do not attempt to model or estimate the meaning of the video content. As a result, searching or browsing video may be frustrating for users seeking video content of particular interest.

A second category of video indexing and retrieval systems attempts to classify video sequences into categories, such as, news, sports, action movies, close-ups, or crowds. These classifications may facilitate browsing video sequences at a coarse level but are of limited usefulness in aiding the user to find content of interest. Users often express the object of their searches in terms of labels with more exact meanings, such as, keywords describing objects, actions, or events. Video content analysis at a finer level than available with most classification systems is desirable to more effectively aid users to find content of interest.

The third category of techniques for analyzing video content applies rules relating the content to features of a specific video domain or content subject area. For example, methods have been proposed to detect events in football games, soccer games, baseball games and basketball games. The events detected by these methods are likely to be semantically relevant to users, but these methods are heavily dependent on the specific artifacts related to the particular domain, such as editing patterns in broadcast programs. This makes it difficult to extend these methods to more general analysis of video from a broad variety of domains.

What is desired, therefore, is a generic system for video analysis which reliably detects semantically significant events in a video.

DETAILED DESCRIPTION OF THE PREFERRED EMBODIMENT

After consideration of video content in sports broadcasts, the present inventors came to the realization that important events are frequently followed by slow motion replays of the event. A slow motion replay is typically inserted into the video content based on a decision by the producers of the broadcast, who are generally knowledgeable with regards to the sports game in question. Therefore, the presence of a slow motion replay in the video content is a very strong indication that an important or interesting event occurred in the sports game being broadcast. The slow motion replay is typically a replay of the event over a longer time duration than the corresponding portion of the original event. Further, unlike attempting to design a system that is specifically tailored to a particular sporting event, the use of slow motion replays is sufficiently generic in nature and therefore applicable to most sports, and in fact to any other type of video programming. Accordingly, if a system can be designed to accurately detect slow motion replays, they may be presented, or otherwise used, as representative of semantically important events of the video and subsequent summarization of the video content. Moreover, the system should be designed such that it is free from specific assumptions regarding the nature of the particular sport. The resulting information from the slow motion replay segments may be used as a generic cue in event detection and generating video highlights, either as standalone information or possibly in combination with other types of information.

The resulting summary (e.g., highlight) information may be utilized by any party, such as for example, the provider of the video content or the consumer of the video content to provide highlights (or otherwise) of events that may vary in duration according to personal preferences, usage conditions, and requirements on the system resources. A provider, for instance, may provide multiple highlights of a sports event, with varying durations, to the consumer.

The system of the present invention detects slow motion segments of a video sequence for the purpose of summarizing the video. This is in contrast to existing systems that use slow motion segments to merely classify video content as sports or non-sports. Furthermore, existing systems do not provide a solution for localizing the boundaries of slow motion replay segments precisely. The proposed system provides a system to more precisely localize slow motion replay segments and their boundaries in a video stream.

The preferred embodiment of the proposed technique includes the use of a statistical model of the video stream containing a slow motion replay segment. The use of this statistical model, known in the field as a "Hidden Markov Model", offers significant advantages in detecting the slow motion replay segments over existing systems. Firstly, this statistical model is a flexible framework that is characterized by the "states" of the video stream, as well as the transitions from one state to the next. States manifest themselves through observable characteristics, which can be measured directly from the video data. States, describing parts of a slow motion replay segment, can be flexibly added to the model as needed for a particular application. The preferred system utilizes a set of video characteristics that can be measured easily and require little computational power.

Secondly, the statistical model can be trained with actual video data, so that it accurately models video streams containing slow motion replay segments. Existing systems do not allow the slow motion replay detection method to be trained.

Thirdly, the framework allows for an efficient and statistically optimal technique to find the boundaries (start point and end point) of slow motion replay segments, by matching the states of the model to the events in the video stream. Furthermore, the framework allows one to flexibly add or delete particular observable characteristics measured from the video data. In existing systems, only a fixed set of measurements are used to detect the presence of slow motion segments. In contrast, the preferred embodiment of the system allows one to add new measurements to the model, which can significantly enhance the detection performance. The system uses measurements from the video data of an audiovisual stream only, but the proposed system is not limited to the use of video data only. It should be understood that other measurements, such as those from the audio data, can be included with the system.

The system of the present invention also includes a novel method for distinguishing slow motion replay segments that are part of the sports game in question from those that are part of commercials inserted periodically in the video material. However, it should be understood that the overall system may also utilize other techniques for distinguishing or filtering out commercials from the slow motion replay detection results, for instance, existing detection techniques for commercials.

Furthermore, the system describes several techniques to generate video summaries, given the detected slow motion replay segments and the location of their boundaries, and possibly based on knowledge of the sports game in question.

The description herein generally refers to sports sequence, but it is to be understood that the technique described herein is applicable to other video content.

Figure 1:
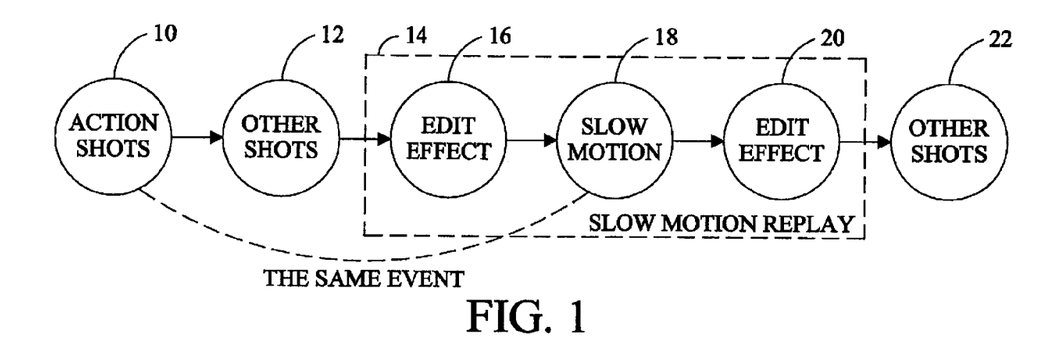
FIG. 1 illustrates a pattern of slow motion replay segments.

Referring to FIG. 1, it is beneficial to first introduce the pattern of the slow motion replay in sports video prior to discussing the mechanisms for video analysis. The pattern of a slow motion replay in sports programs includes very fast movement of objects (persons, balls, and etc.), generally referred to as action shots at block 10. Following the action shots at block 10 there may be other shots or video content at block 12 prior to the slow motion replay at block 14. A special effect, or edit effect at block 16, is almost always present between the normal shots in block 12 and 16 and the slow motion replay segment in block 18. After the slow motion replay in block 18, another edit effect in block 20, is usually present before resuming normal play. Following the slow motion replay 14 other shots are presented at block 22, such as the continuation of the sporting event.

Figure 2:
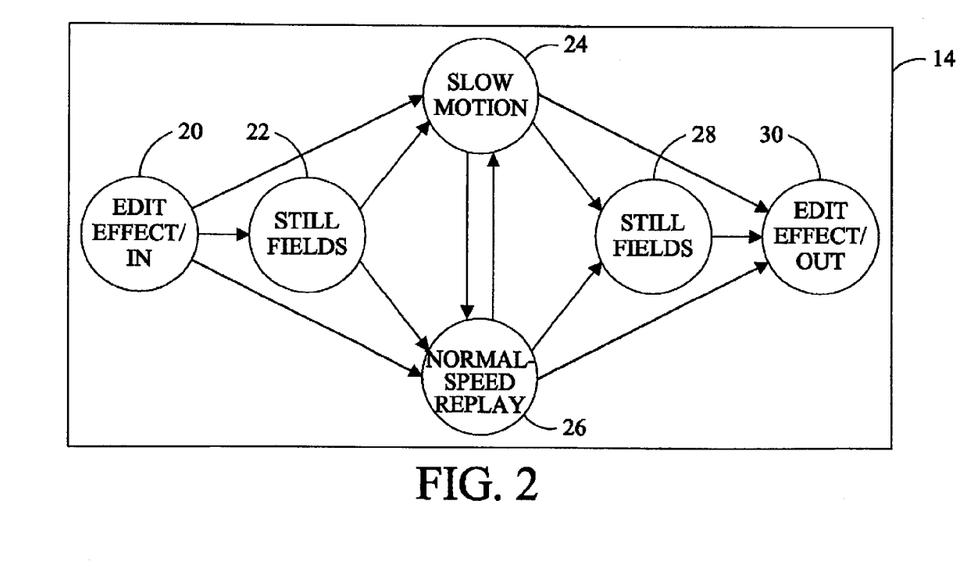
FIG. 2 illustrates a detailed example of slow motion replay.

A more detailed structure of the slow motion replay 14 of FIG. 1 is shown in FIG. 2. Typically the procedure of the slow motion replay includes six components, namely, edit effects in 20, still fields 22, slow motion replay 24, normal replay 26, still fields 28, and edit effect out 30.

The edit effects in 20 and edit effects out 30, mark the starting and end points of the procedure of the slow motion replay 14, and typically are gradual transitions, such as fade in/out, cross/additive-dissolve, and wipes. Frequently, the logo of the television station will be shown during the edit effects in 20 and edit effects out 30. Other techniques may likewise be used.

The slow motion replay 24 is achieved typically using two techniques, namely, replacing some of the fields in the clips recorded at normal speed (60 fields/second for NTSC); or playing at 60 fields/second video clips which are recorded at a higher speed (180 fields/second for NTSC) by high-speed super motion cameras. Other techniques may likewise be used.

The still fields 22 is sometimes used at the starting and ending points of a slow motion replay segment. Also, during the duration of the slow motion replay segment, the video playing speed is not always slower than the normal speed because the normal-speed play 26 is sometimes used.

Figure 3:
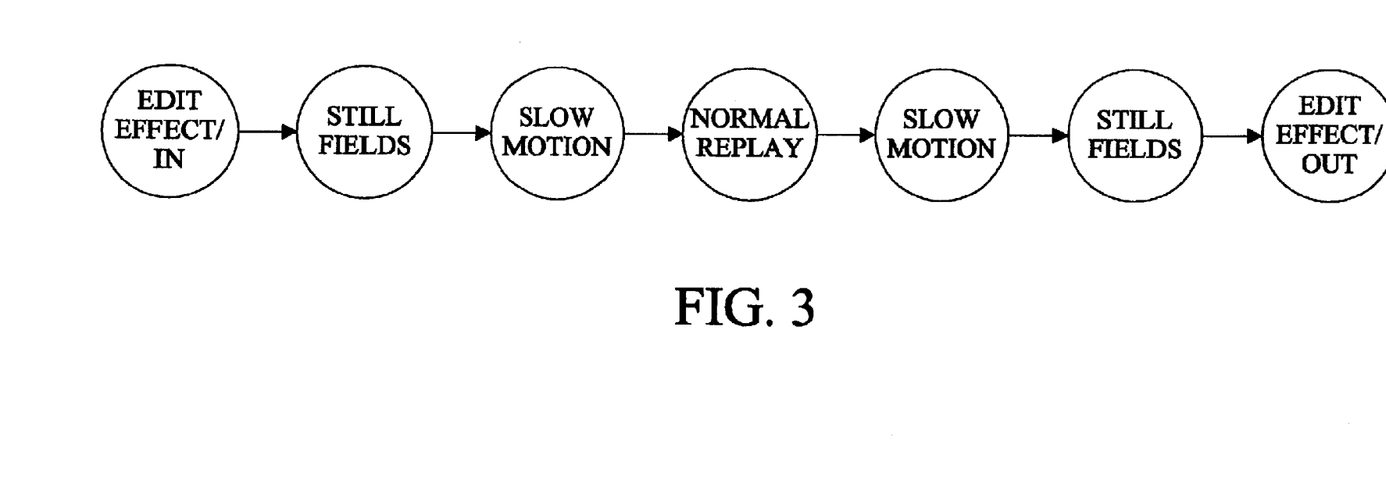
FIG. 3 illustrates one typical procedure for slow motion replay.

After consideration of the slow motion replay, the present inventors determined that typically the edit effect in 20, slow motion replay 24, and edit effect out 30, are included in the slow motion replay 14. The other three elements and others, if desired, are not as frequently used, but may be present in any video sequence. Accordingly, there may be nearly endless possible combinations of the features of a slow motion replay. Referring to FIG. 3, one example of a slow motion replay segment is shown.

While considering the processing of the slow motion replay, and all of its permutations, the present inventors further determined that commercials frequently use slow motion segments. Thus for a robust video summarization system, it is desirable to distinguish slow motion replay segments of the video, such as in sports, from the slow motion segments in commercials.

Figure 4:
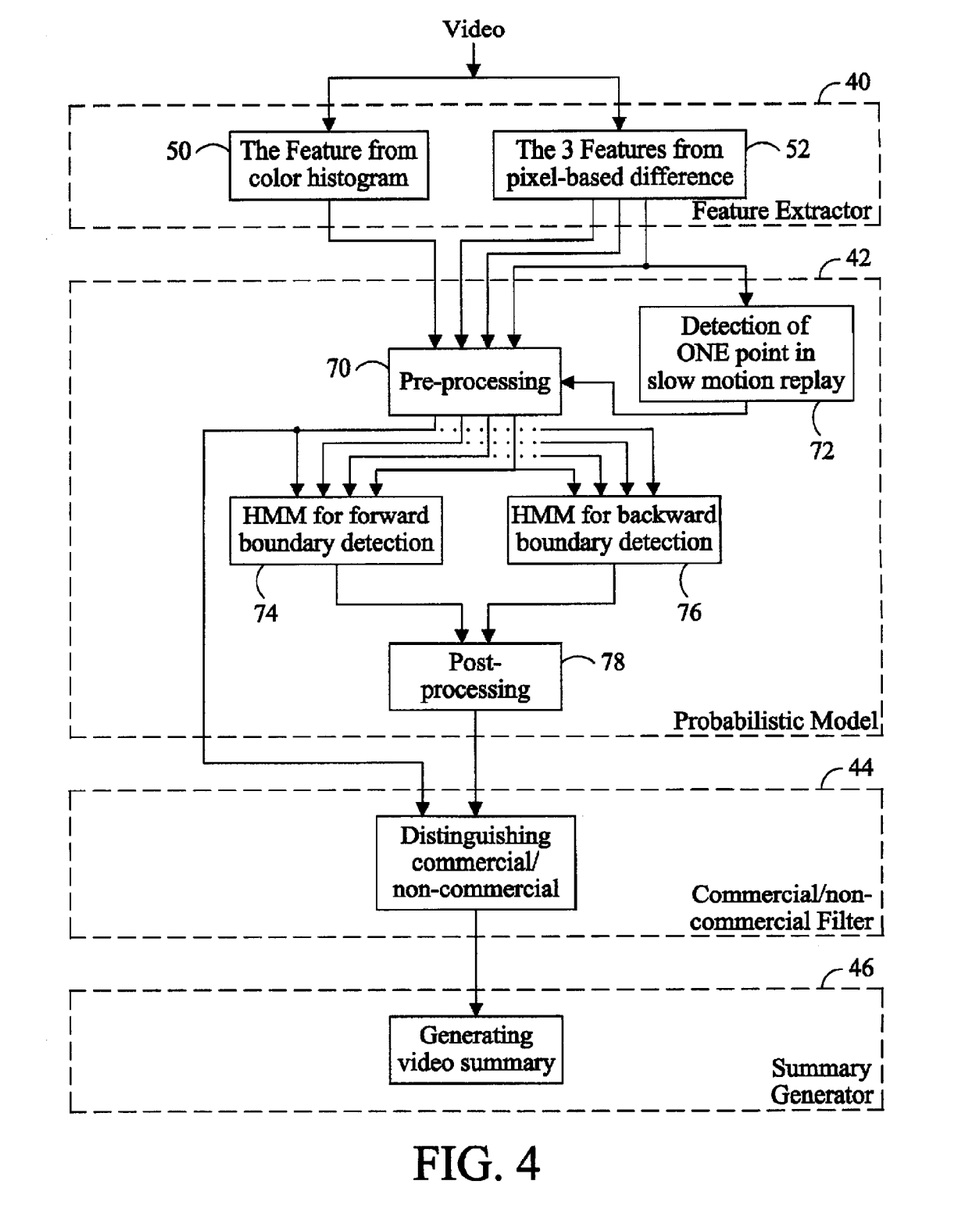
FIG. 4 illustrates an exemplary example of a technique for detecting slow motion.

Referring to FIG. 4, the preferred structure of the video summarization system is shown. The system may include four primary portions, namely, a feature extractor 40, a probabilistic model using Hidden Markov Model (or other model) to integrate the features and determine boundaries 42, a commercial/non-commercial filter distinguishing commercial and non-commercial slow motion replay segments 44, and a summary generator for generating summaries based on the detected slow motion replay segments 46.

The feature extractor 40 is preferably designed to extract a feature from color histograms at block 50, and three features from pixel-based differences at block 52. The pixel based technique allows flexibility in the content suitable for analysis. Further, the system is preferably free from using motion vectors, typically found in MPEG-2 video stream. Other feature extraction techniques may likewise be used. The features extracted at block 52 characterize the slow motion, still fields, and/or normal-speed replay components of a replay segment. The preferred technique used by block 52 is a pixel-wise difference operation on two subsequent fields. Any other set of fields may be used, as desired. The feature extracted at block 50 characterizes the edit effect component, and is preferably determined based upon a RGB color histogram of each field.

Figure 5:
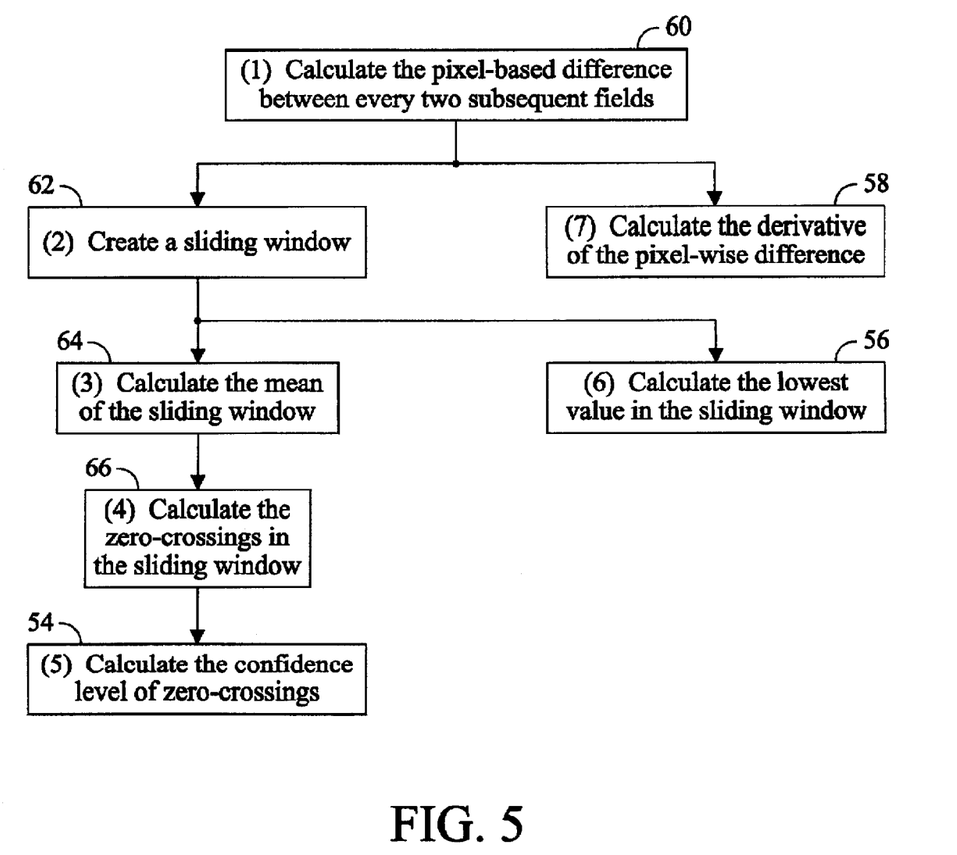
FIG. 5 illustrates pixel-wise difference feature extraction.

Referring to FIG. 5, the three features of block 52 may be characterized by the number of zero-crossings in a sliding window at block 54, the lowest value in the sliding window at block 56, and the derivative of the pixel-wise differences at block 58. The zero-crossings at block 54 and the lowest value in the sliding window at block 56 are directed toward detecting the field repetition, and the derivative at block 58 is directed toward detecting the still fields. In summary, block 60 calculates the pixel-wised differences between two subsequent fields, block 62 creates a sliding window along the time axis, blocks 64, 66, and 54 calculate zero-crossings in the sliding window, block 56 calculates the lowest value in the sliding window, and block 58 calculates the derivative of the pixel-wised differences.

The preferred technique for the pixel-wise difference calculations shown in FIG. 5 is described below. It is to be understood that other pixel-wise difference techniques may likewise be used, as desired. Block 60 calculates the pixel-wise differences between two subsequent fields. The equation may be as follows:

$$D(t)=f(img(n,m,t), img(n,m,t-1))$$

which describes the general equation for calculating the pixel-wise differences, in which f(x) represents a general function for calculating the pixel-wise difference between two images, and img(n,m,t) indicates the pixel information at coordinate (n,m) and at time t. Any function which gives a description of difference between two images can be used, as desired. Two functions of particular interest for calculating the pixel-wise differences include the mean order-p luminance differences, and the mutual information luminance differences.

The mean order-p luminance difference may be mathematically described as follows:

$$D(t) = \min \left( \begin{array}{l} \frac{1}{NM} \sum_{n,m} |I(n, m, t) - I(n, m, t-1)|^p, \frac{1}{NM} \sum_{n,m} |I(n-1, m, t) - I(n, m, t-1)|^p, \\ \frac{1}{NM} \sum_{n,m} |I(n+1, m, t) - I(n, m, t-1)|^p \end{array} \right)$$

where I(n,m,t) is the luminance intensity at (n,m) at time t, p is the order, and N and M are the vertical and horizontal resolutions, respectively. It noted that the system may calculate multiple distances, such as three, and select the desired one, such as the lowest one. The lowest one is preferably selected because if the slow motion replay is generated by field repetition, in order to compensate for the one line difference between the odd and even fields, most slow motion equipment shift the repeated field one line up or down from the original position accordingly. Ideally, this shift may be predicted so that the system does not need to calculate three differences. However, many systems do not follow the predicted pattern. Therefore, it is preferred to calculate the three different differences and pick the lowest one.

The mutual information difference may be defined as follows:

$$D(t)=\min (MI(I(n,m,t),I(n,m,t-1)), MI(I(n+1,m,t), I(n,m,t-1)), MI(I(n-1,m,t), I(n,m,t-1)))$$

where MI(x) is the pixel-wise mutual information between two images. Again the system may calculate multiple mutual informations, such as three, and pick one of them, such as the lowest one. The equations previously discussed only use the luminance information to calculate the differences, but it is to be understood that the color information, or other information, may likewise be included, as desired.

Figure 6:
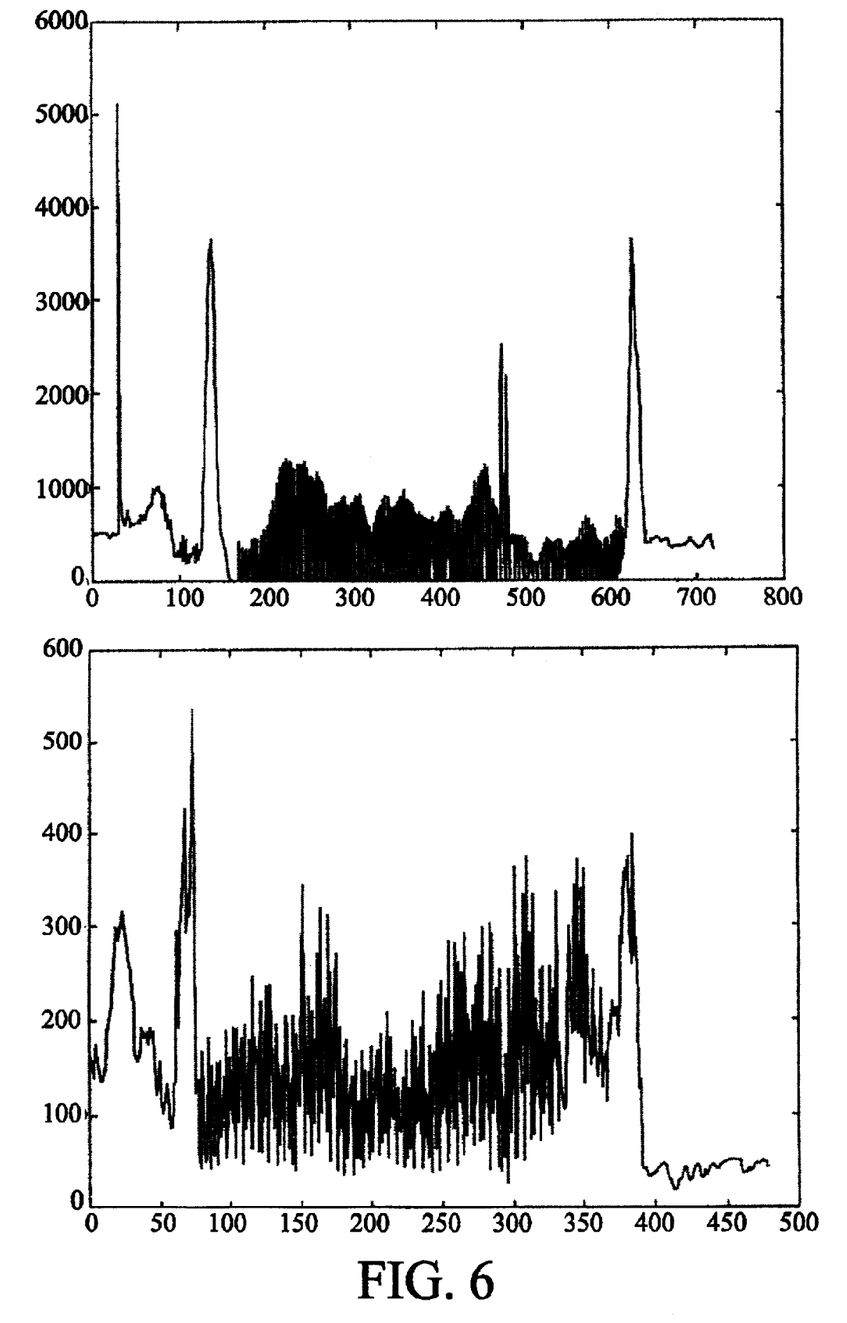
FIG. 6 illustrates mean square difference of slow motion.

The performance of the two aforementioned equations (in the first equation, p=1 and p=2) showed no significant difference. FIG. 6 illustrates two pixel-wised intensity mean square differences (p=2) of two kinds of slow motions generated by: (a) field repetition (NBA Basketball) and (b) super motion VTRs (Soccer). The dramatic fluctuations indicate the period when slow motion replay is happening. For the field repetition method, when the current field repeats the previous field, the difference between two fields is small; when the current field does not repeat the previous field, the difference between two fields is big. The small-big-small changes create the dramatic fluctuations. For the super motion VTR method, because a super motion VTR always works at a fixed 180 fields per second, and the slow motion is often not exactly as 3 times slow as this speed, then some fields will be repeated or dropped during playing. The field repetition and dropping will be reflected as the fluctuations in the pixel-wised differences along the time axis. However, one can notice, the fluctuations of the field repetition method is much stronger than the one of the super motion VTR method.

Block 62 creates a "sliding window" that is S-fields long and moves forward F field(s) each time. In effect, block 62 selects a set of fields for processing. It is to be understood that any set of fields, frames, or otherwise, sequential or non-sequential, may be selected, as desired.

Block 64 calculates a statistical measure of the fields within the sliding window of block 62. Preferably the statistical measure is the mean of the differences, which may be calculated as:

$$\overline{D}(t) = \frac{1}{S} \sum_{s=0}^{S-1} D(t-s)$$

Block 66 calculates the number of zero-crossings for each sliding window. The conventional zero-crossings are counted as follows:

$$zc(t, \theta_i) = \sum_{s=1}^{S-1} trld(D(t-s) - \overline{D}(t), D(t-s-1) - \overline{D}(t))$$

where $$trld(x, y) = \begin{cases} 1 & \text{if } x \geq 0 \ \& \ y \leq 0 \\ 1 & \text{if } x \leq 0 \ \& \ y \geq 0 \\ 0 & \text{else} \end{cases}$$

While the traditional zero-crossings technique may be used, the present inventors determined that it ignores amplitude information, which implies that small fluctuations provide the same result as large fluctuations. Accordingly, the present inventors determined that a modified zero-crossings count technique should include amplitude information. An example of the new technique is as follows:

$$zc(t, \theta_i) = \sum_{s=1}^{S-1} trld(D(t-s) - \overline{D}(t), D(t-s-1) - \overline{D}(t), \theta_i)$$

where $$trld(x, y, \theta) = \begin{cases} 1 & \text{if } x \geq \theta \text{ \&} y \leq -\theta \\ 1 & \text{if } x \leq -\theta \text{ \&} y \geq \theta \\ 0 & \text{else} \end{cases}$$

Figure 7:
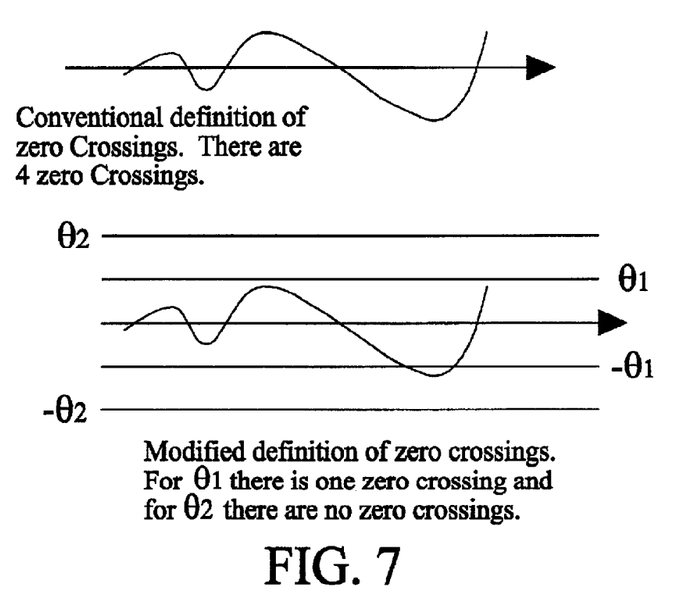
FIG. 7 illustrates differences between different zero crossing techniques.

$\theta_i$ is a threshold indexed by i. Comparing the traditional technique and the modified amplitude sensitive technique, an additional parameter threshold $\theta_i$ is introduced. The bigger the threshold $\theta_i$, the less zero crossings there is. This difference is illustrates in FIG. 7. It is to be understood that any value may be used for the threshold, static or dynamic.

At block 54 a confidence level may be defined by $p_{zc}(t,b)$, based on $\theta_i$. Initially, W ascendant thresholds may be defined. One example of ascendant thresholds is the following table of 12 thresholds (W=12):

| i  | 0 | 1  | 2  | 3  | 4  | 5  | 6   | 7   | 8   | 9   | 10  | 11  |
|----|---|----|----|----|----|----|-----|-----|-----|-----|-----|-----|
| θi | 1 | 11 | 21 | 41 | 61 | 81 | 101 | 121 | 141 | 161 | 181 | 201 |

The confidence level may be defined as follows:

$$p_{zc}(t, \beta) = \frac{i_\beta(t)}{W}$$

$i_\beta$ may be defined as:

$$i_\beta(t) = \text{argmax}\{\theta_i | zc(t,\theta_i) > \beta\}$$

where $\beta$ is another threshold chosen from 1 and S−1.

Block 56 may define the lowest value of the pixel-wise difference of subsequent fields in the S-field sliding window: le(t) where le(t) may be defined as:

$$le(t) = \min(D(t), D(t-1), \ldots, D(t-S+1))$$

Block 58 may define the derivative of the pixel-wise difference of adjacent fields: dr(t) as:

$$dr(t) = D(t) - D(t-1)$$

Block 50 (referring again to FIG. 4) the edit effects may any transition detection, such as a gradual transition detection. The preferred technique first defines the distance between two color histograms as:

$$D_H(t) = \frac{1}{I} \sum_{m=R,G,B} \sum_{i=0}^{255} (H_m(i, t) - H_m(i, t-1))$$

where $H_R(I,t)$, $H_G(L,t)$, and $H_B(I,t)$ are the histograms of red, green and blue colors of the field at time t, respectively. The video-evolution ratio (VER) may be further defined as:

$$ver(t) = \frac{D_H(t)}{D_{cum}(t)} \text{ where}$$

$$D_{cum}(t) = \sum_{s=0}^{S-1} |D_H(t-s)|^2$$

From the previous discussion, it may be observed that the structure of a slow motion replay segment is rather complicated. There may exist six different components, and these components can generate a large number of combinations. An efficient high-level framework is useful to model the complexity. Specifically, the preferred system uses an Hidden Markov Model (HMM) as the framework to integrate the four features from the feature extractor, detect the boundaries, and calculate the probability of every candidate of the slow motion replay segments.

HMM is a very powerful probabilistic tool. By introducing hidden states, HMM has the ability to model non-stationary signals and has time-warping ability. The theory of HMM also offers good training and inference algorithms. The training algorithm, which may be the Expectation-Maximization (EM) algorithm, can guarantee the convergence to a local minimum. The inference algorithm, which may be the Viterbi algorithm, can guarantee the globally optimal hidden states of an observation sequence. Furthermore, both algorithms are computationally efficient.

A slow motion replay segment can be effectively modeled by HMM. The system can map the six possible components in a segment to the hidden states of HMMs. Furthermore, it is easy to add new features, such as audio features, to a HMM.

However, using HMM in the detection of slow motion detection is not straightforward. HMM was originally developed for pattern recognition/classification, not for pattern detection. The HMM is good at giving the probability that a sequence belongs to the class that the HMM models. It is hard for an HMM to detect the starting and ending points of a pattern hidden in a long input sequence. One simple solution is to use some other methods to find all the possible candidates of starting end ending points, and use an HMM to filter out the ones that have very low probabilities yielded by the HMM.

To solve this problem, the present inventors developed a new technique which makes the HMM find the starting and ending points (in other words, boundaries) of the slow motion replay. Instead of finding some candidates, the new technique uses a normalization+threshold technique to find one point in the candidates, and then uses two foreword and backward HMMs, which all begin from the one point, to find the boundary themselves by introducing a "boundary" hidden state. The system may extract multiple, such as 800, continuous fields forwardly and backwardly from the one point as the input sequences to the forward- and backward-HMM, respectively. (Note the backward-sequence is in time-reversed order.). Because all the slow motion replays are typically less than 20 seconds, (if the field rate is 60 fields per second, the length is less than 1200-fields long) the 800 backward and forward points should contain the starting point and ending points, respectively. The backward- and forward-HMMs, sharing the same parameters and structure, have a "boundary" hidden state representing the "normal play" stage. When the Viterbi algorithm is used to calculate the optimal hidden states, the first field at which this special "boundary" hidden state is reached, is the starting point in the backward sequence and the end point in the forward sequence.

As shown in FIG. 4, there are five components in the preferred probabilistic model: (1) preprocessor 70; (2) one-point detector 72; (3) forward-HMM 74; (4) backward-HMM 76; and (5) postprocessor 78. The preprocessor 70 is used to convert the features into the HMMs' range. The postprocessor 78 may be used to filter out some candidates by the probability generated by two HMMs about these candidates or merging some overlapping candidates. Each of the components is discussed in turn.

The pre-processor 70 translates the different ranges of the four features into the one that HMMs can use, which has V discrete levels. For the feature which is based on zero-crossings, it is already in the format of V discrete levels. However, the remaining three are in continuous formats. Thus, uniform or non-uniform quantization algorithms are used to quantize them into V discrete levels. While uniform quantization is fairly simple, non-uniform quantization algorithms give a better result. Non-uniform quantization algorithms could be any vector quantization or self-clustering algorithms, such as the LBG algorithm or the SOM algorithm.

Figure 8:
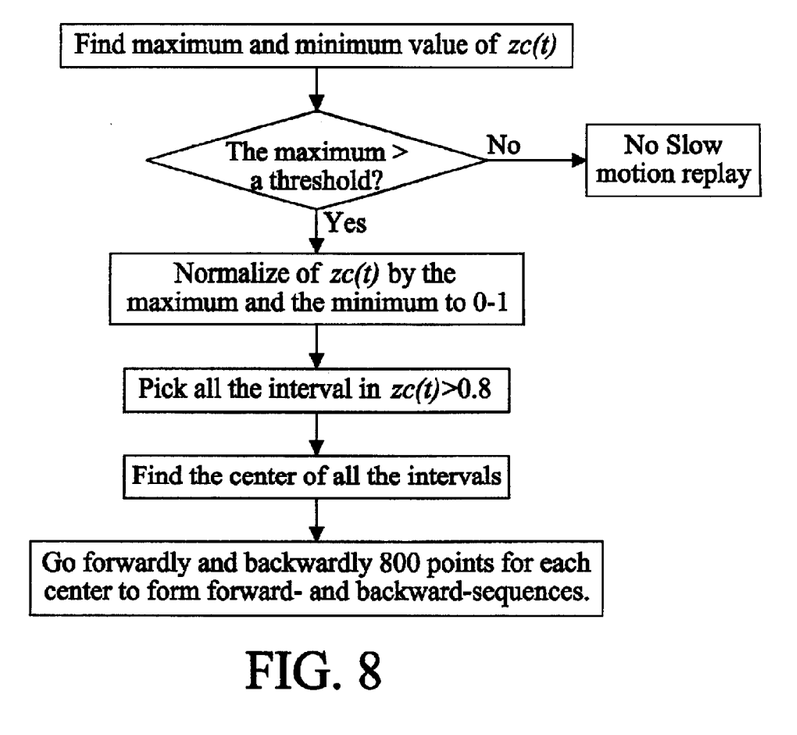
FIG. 8 illustrates one technique to determine the starting points of backwards and forward HMMs.

Referring to FIG. 8, a block diagram of an exemplary one point detector is shown that detects one point in the possible slow motion replay candidates.

The forward and backward HMMs 74 and 76 may be designed as follows. Let the observation sequence be $O=(o_1, o_2, \ldots o_T)$, where $oT=\{le(t), dr(t), zc(t), ver(t)\}$ is the V-levels discrete observation vector at time t. The corresponding hidden states are $q=(q_1, q_2, \ldots q_T)$. The observation probably is:

$$p(o_{t|qt}) = p(le(t)|q_t)p(dr(t)|q_t)p(zc(t)|q_t)p(ver(t)|q_t)$$

The joint probability is:

$$p(O,q) = p(q_1)p(q_2|q_1) \ldots p(q_T|q_{T-1})p(o_1|q_1)p(o_2|q_2) \ldots p(o_T|q_T)$$

Figure 9:
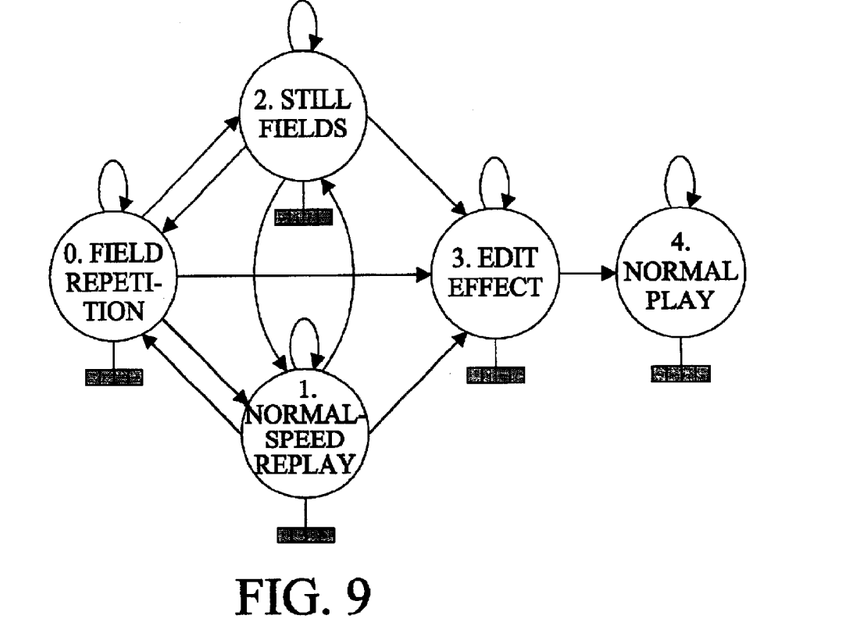
FIG. 9 illustrates one structure of HMM modeling of slow motion replay.

To model the components and their relations in a slow motion replay segment shown in FIG. 2 and simultaneously detect the boundaries, the system may use 4+1 states, which may be as follows:

qt=0: field repetition;
$q_t$=1: normal replay
$q_t$=2: still field
qt=3: edit effect
$q_t$=4: normal play, where subscript t indicates the time index. The first four are exactly corresponding to the four components in slow motion replay: slow motion, normal-speed replay, still fields, and edit effect, respectively. The fifth is used to determine the boundaries after running the Viterbi algorithm. It corresponds to the component, other shots, in FIG. 1. The structure of the HMM is shown in FIG. 9. The circles represent hidden states, the dark boxes represent observations, the arrows represent transition probabilities, and the lines represent observation probabilities.

From FIG. 2 the state-transition probability matrix may take the form of:

$$\begin{bmatrix} a_{00} & a_{01} & a_{02} & a_{03} & 0 \\ a_{10} & a_{11} & a_{12} & a_{13} & 0 \\ a_{20} & a_{21} & a_{22} & a_{23} & 0 \\ 0 & 0 & 0 & a_{33} & a_{34} \\ 0 & 0 & 0 & 0 & a_{44} \end{bmatrix}$$

and the initial probability is:

$$p(q_1) = \begin{cases} 1 & \text{if } q_1 = 0 \\ 0 & \text{if } q_1 = 1 \\ 0 & \text{if } q_1 = 2 \\ 0 & \text{if } q_1 = 3 \\ 0 & \text{if } q_1 = 4 \end{cases}$$

Figure 10:
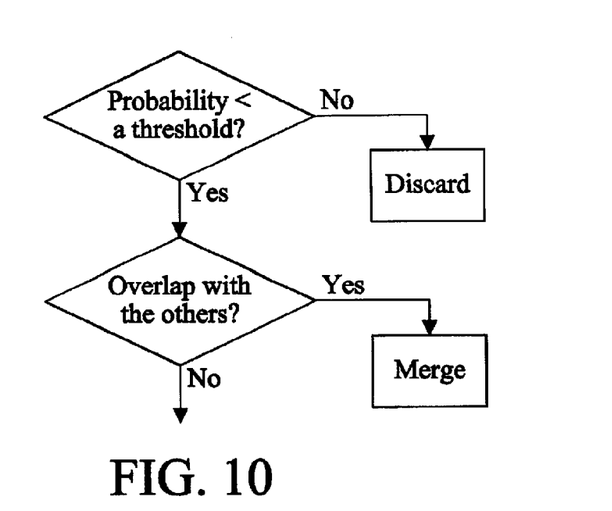
FIG. 10 illustrates a post-processor.

The post-processing at block 78 receives the boundaries detected by the forward and backward HMMs 74 and 76. If the probability calculated by the HMMs 74 and 76 is smaller then a threshold, then the boundaries are not valid, and discarded. If the boundaries are overlapped to the boundaries generated by the other candidates, the overlapping boundary sets are merged together to form a larger set.

At block 44 the system distinguishes between commercials and non-commercials. For example, there may be slow motion segments in the commercials that are included in the sports programming, as is the usual case in television broadcasts. Thus, the system should distinguish between slow motion segments in commercials (referred to as "commercial slow motion") and in the actual program (referred to as "non-commercial slow motion"). For distinguishing between the two types of slow motion and thus filtering out the commercial slow motion, the present inventors have developed a commercial/non-commercial slow-motion filter.

Figure 11:
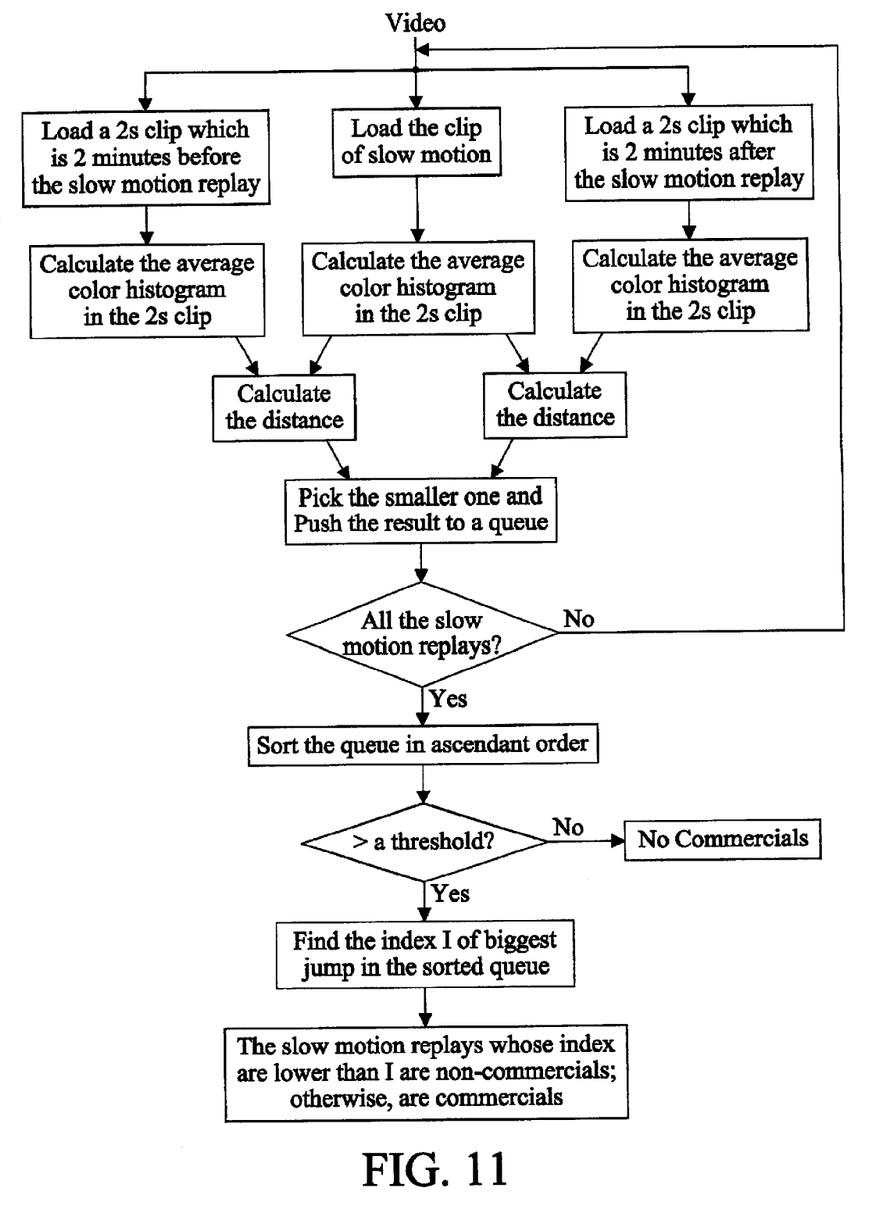
FIG. 11 illustrates a commercial/non-commercial filter.

Referring to FIG. 11, the preferred structure of the commercial/non-commercial filter is based on the principal that the color histogram of a low motion segment in a commercial is different from the color histogram of a segment in the remaining video, such as the sporting event. On the other hand, all the segments in a game have similar histograms. Thus, once the system has a segment of the game as a reference, by comparing the distances of color histogram of each slow motion replay with the color histogram of a reference, the system can filter out the commercial slow motion replay segments.

Figure 12:
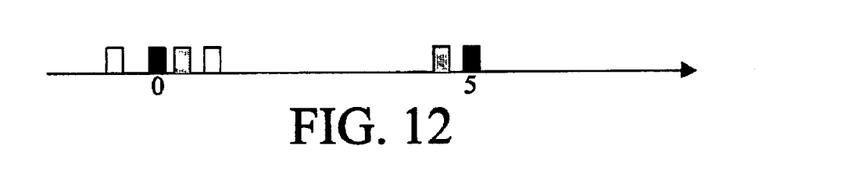
FIG. 12 illustrates a relation between slow motion in commercials and slow motion replay in a game.

The system first finds a game segment as a reference. The system takes advantage of the observation that a commercial is typically less than 2 minutes long, and the interval between two commercials is greater than 5 minutes. From this the present inventors postulate that for any slow motion replay, the two positions that are two minutes before or after the slow motion is the game. To make the system more robust, the system may use these two positions as the two references to determine if the slow motion is commercial or not. Specifically, the system may calculate the average color histogram differences between the slow motion replay and the average color histograms of the two 2 second segments at these two positions, and pick a lower one as the distance between the color histogram of this slow motion and the color histogram of the game reference. This relation is shown in FIG. 12 where the black boxes represent slow motion in commercials, the gray boxes represent slow motion in sports, while the white boxes are references for the first commercial slow motion (the first black box).

After the distances of the slow motion replay to their references are calculated, the system determines commercial or non-commercial based on the distances. The algorithm is shown in the lower half of FIG. 11. A threshold may be used to determine if there are any slow motions in commercials. If there are some, then the system may use any self-clustering technique to divide all the slow motion into two categories: commercial or non-commercial. The technique shown in FIG. 11 is based on the biggest derivative of the shorter distance. The underlying principle is that the distances within commercials are similar and distances within non-commercials are similar, but there is a significant gap between these two categories of distances.

The summary generator at block 46 (see FIG. 4) may generate highlight summaries of the video programs based on the slow motion replay information. The resulting highlights provide multiple levels of summaries with varying detail, ranging from the shortest to longer highlights. The multiple levels of summaries may include, for example, the following:

1. Concatenation of one or more of the slow motion segments (non-commercial). the resulting highlight provides a compact summary of the program and it is free from commercials.
2. Concatenation of expanded (non-commercial) slow motion segments. Expansion is performed by adding $t_1$ and $t_2$ seconds to the beginning and end of each slow motion segment.
3. The technique described in 2 above, but the expansion time intervals are selected as a function of the statistics of the corresponding slow motion replay segments. In one embodiment, the value of $t_1$ is set proportional to the actual length of the event depicted in the slow motion replay. The value of the proportionality factor k is determined by the length of the desired summary. In this case, however, there may be a possibility of overlapping with the previous slow motion segment when k is sufficiently large. To avoid such events, a check mechanism may be introduced through which the value of k is reduced.

What is claimed is:

1. A method of summarizing video depicting an event comprising:
   (a) detecting a plurality of slow motion replay segment within said video depicting said event;
   (b) summarizing said video by including said plurality of slow motion replay segments in a summarization, wherein said summarization is less than said video.

2. The method of claim 1 wherein said summarization is provided to a user.

3. The method of claim 2 wherein the duration of said summarization is based upon the preferences of said user.

4. The method of claim 2 wherein the duration of said summarization is based upon the usage conditions of said summarization.

5. The method of claim 2 wherein the duration of said summarization is based upon the system resources of the user.

6. The method of claim 1 wherein said summarization has fewer frames than said video.

7. The method of claim 1 wherein said summarization depicts sections of said video comprising the said summarization.

8. A method of determining the boundary of a slow motion replay of an event in a video comprising:
   (a) determining statistical measure of different portions of said video that include said event and said slow motion replay of said event;
   (b) based upon said statistical measure determining said boundary of said slow motion replay of said event,;
   (c) summarizing said video including a plurality of said slow motion replays.

9. The method of claim 8 wherein said statistical measure includes a Hidden Markov Model.

10. The method of claim 9 wherein said statistical measure includes a state.

11. The method of claim 10 wherein said boundary is based upon the change of said state to another state.

12. A method of training a statistical model for video comprising:
    (a) providing video data that includes an event and a slow motion replay of said event to said statistical model;
    (b) training said statistical model based upon said video to improve the likelihood of identifying slow motion replay segments in other video;
    (c) summarizing said video including a plurality of said slow motion replays.

13. The method of claim 12 wherein said statistical model is a Hidden Markov Model.

14. The method of claim 13 wherein said model includes a plurality of states.

15. A method of identifying a slow motion replay of an event in a video comprising:
    (a) identifying a first effect included within said video that is not a natural event;
    (b) identifying a second effect included within said video that is not a natural event;
    (c) classifying a portion of the time between said first effect and said second effect as being said slow motion replay of said event;
    (d) summarizing said video including a plurality of said slow motion replays.

16. The method of claim 15 wherein said event is a sporting activity.

17. The method of claim 15 wherein said video contains primarily sports.

18. The method of claim 15 wherein said slow motion replay is a sporting activity.

19. A method of identifying a sequence in a video comprising:
    (a) identifying an action segment characterized by relatively fast moving objects;
    (b) identifying a first effect included within said video that is not a natural event, said first effect temporally later than said action segment;
    (c) identifying a slow motion replay of said action segment, said slow motion replay temporally later than said first effect;
    (d) identifying a second effect included within said video that is not a natural event, said second effect temporally later than said slow motion replay, wherein said action segment, said first effect, said second effect, and said slow motion replay are identified free from a user having to manually identify any of said action segment, said first effect, said second effect, and said slow motion replay;
    (e) summarizing said video including a plurality of said slow motion replays.

20. The method of claim 19 wherein said identifying of steps (a), (b), (c), and (d) are based upon a statistical model.

21. The method of claim 19 wherein said video includes sporting activity.

22. A method of identifying a slow motion replay of an event in a video comprising:

(a) identifying a first effect included within said video that is not a natural event;

(b) identifying a first plurality of still fields within said video, said still fields temporally later than said first effect;

(c) identifying an intermediate segment, said intermediate segment temporally later than said first plurality of still fields;

(d) identifying a second plurality of still fields within said video, said still fields temporally later than said intermediate segment;

(e) identifying a second effect included within said video that is not a natural event, said second effect temporally later than said second plurality of still fields;

(f) wherein said intermediate segment, said first effect, said second effect, said first and second plurality of still fields are identified free from a user having to manually identify any of said intermediate segment, said first effect, said second effect, said first and second plurality of still fields;

(g) summarizing said video including a plurality of said slow motion replays.

23. The method of claim 22 wherein said identifying of steps (a), (b), (c), (d), and (e) are based upon a statistical model.

24. The method of claim 22 wherein said video includes sporting activity.

25. A method of analyzing video comprising:

(a) detecting a plurality of slow motion segments within said video;

(b) characterizing at least one of said slow motion segments as a commercial and characterizing at least another of said slow motion segments as not a commercial;

(c) summarizing said video by including said plurality of slow motion replay segments in a summarization, wherein said summarization is less than said video.

26. The method of claim 25 wherein said another of said slow motion segments is a replay segment.

27. The method of claim 26 wherein said video is a sporting activity.

28. A system for summarizing video comprising:

(a) a feature extractor;

(b) a probabilistic model that identifies potential slow motion replay segments provided by said feature extractor;

(c) a filter distinguishing commercials from non-commercial of said potential slow motion replay segments; and (d) a summary generator summarizing said video by including said plurality of slow motion replay segments in a summarization, wherein said summarization is less than said video.

29. The system of claim 28 wherein said feature extractor includes a histogram.

30. The system of claim 29 wherein said histogram is color.

31. The system of claim 28 wherein said feature extractor uses pixel-based differences.

32. The system of claim 31 wherein said differences is based upon the mean order-p luminance difference as follows:

$$D(t) = \min\left(\frac{1}{NM}\sum_{n,m}|I(n,m,t)-I(n,m,t-1)|^P, \frac{1}{NM}\sum_{n,m}|I(n-1,m,t)-I(n,m,t-1)|^P, \frac{1}{NM}\sum_{n,m}|I(n+1,m,t)-I(n,m,t-1)|^P\right)$$

where $I(n,m,t)$ is the luminance intensity at $(n,m)$ at time $t$, $p$ is the order, and $N$ and $M$ are the vertical and horizontal resolution, respectively.

33. The system of claim 28 wherein said feature extractor is free from using motion vectors.

34. The system of claim 28 wherein said feature extractor characterizes slow motion segments, still field segments, and normal-play segments of said video.

35. The system of claim 28 wherein said feature extractor includes a sliding window and characterizes the number of zero-crossings within said sliding window.

36. A method of identifying the boundaries of a candidate slow motion segment of a video comprising:

(a) using a non-Hidden Markov Model technique to determine a frame in said candidate slow motion segment;

(b) using a Hidden Markov Model technique to identify said boundaries of said candidate slow motion segment;

(c) summarizing said video including a plurality of said slow motion segments.

37. The method of claim 36 wherein said identify said boundaries are using forward and backward Hidden Markov Model techniques.

38. A method of identifying a slow motion segment in a video using a probabilistic model comprising:

(a) receiving said video that includes a candidate slow motion segment;

(b) processing said video using said probabilistic model using a Hidden Markov Model that includes at least five components, wherein said components include:

(i) a preprocessor that converts features in a range suitable for a forward Hidden Markov Model and a backward Hidden Markov Model;

(ii) a one-point detector identifying at least one frame in said candidate slow motion segment;

(iii) said forward Hidden Markov Model processing said video;

(iv) said backward Hidden Markov Model processing said video;

(v) a post processor that filters the results of steps (iii) and (iv);

(c) summarizing said video including a plurality of said slow motion segments.

* * * * *

UNITED STATES PATENT AND TRADEMARK OFFICE
CERTIFICATE OF CORRECTION

PATENT NO. : 6,931,595 B2
APPLICATION NO. : 09/823437
DATED : August 16, 2005
INVENTOR(S) : Hao Pan et al.

It is certified that error appears in the above-identified patent and that said Letters Patent is hereby corrected as shown below:

Col. 7, line 61
Change "$H_R(I,t)$, $H_G(L,t)$, and $H_B(I,t)$" to --$H_R(I,t)$, $H_G(I,t)$, and $H_B(I,t)$--.

Col. 9, line 34
Change "oT = {le(t), dr(t), zc(t), ver(t)]" to --oT = {le(t), dr(t), zc(t), ver(t)--.

Col. 9, line 49
Change "qt=0:" to --$q_t$=0:--.

Col. 9, line 52
Change "qt=3:" to --$q_t$=3:--.

Signed and Sealed this

Eighth Day of July, 2008

JON W. DUDAS
*Director of the United States Patent and Trademark Office*